US012800894B2

(12) United States Patent
Lee et al.

(10) Patent No.: US 12,800,894 B2
(45) Date of Patent: Nov. 17, 2026

(54) STRAIN-INSENSITIVE WAVE PLATE ARRANGEMENTS

(71) Applicant: Apple Inc., Cupertino, CA (US)

(72) Inventors: Seung Hoon Lee, Santa Clara, CA (US); Fuyi Yang, San Jose, CA (US); Hanyang Huang, Santa Clara, CA (US); Se Hyun Ahn, Santa Clara, CA (US); Wentao Li, Cupertino, CA (US); Young Cheol Yang, Sunnyvale, CA (US); Zhibing Ge, Sunnyvale, CA (US); Dagny Fleischman, Campbell, CA (US)

(73) Assignee: Apple Inc., Cupertino, CA (US)

( * ) Notice: Subject to any disclaimer, the term of this patent is extended or adjusted under 35 U.S.C. 154(b) by 330 days.

(21) Appl. No.: 18/480,695

(22) Filed: Oct. 4, 2023

(65) Prior Publication Data

US 2025/0028157 A1 Jan. 23, 2025

Related U.S. Application Data

(60) Provisional application No. 63/514,939, filed on Jul. 21, 2023.

(51) Int. Cl.
*G02B 17/08* (2006.01)
*G02B 25/00* (2006.01)

(52) U.S. Cl.
CPC ....... *G02B 17/0856* (2013.01); *G02B 25/001* (2013.01)

(58) Field of Classification Search
CPC ........ G02B 27/01-2027/0198; G02B 17/0856; G02B 27/001

(Continued)

(56) References Cited

U.S. PATENT DOCUMENTS 11,002,970 B2 5/2021 Martinez et al.
2004/0218271 A1 11/2004 Hartmaier et al.

(Continued)

FOREIGN PATENT DOCUMENTS

KR 20170068861 A * 6/2017 ........... G02B 5/3083
WO 2021007354 A1 1/2021
WO 2022164625 A1 8/2022

OTHER PUBLICATIONS

Ho-Jin Choi et al., Optical anisotropy conversion of retarder film made of rodlike and crosslike reactive molecules, and its dependence on the relative ratio and the orientation of the constituent molecules, Optical Materials, 2020, pp. 1-5, Elsevier B.V.

*Primary Examiner* — Jessica M Merlin

(74) *Attorney, Agent, or Firm* — Treyz Law Group, P.C.; Joseph F. Guihan; Jinie M. Guihan

(57) ABSTRACT

An electronic device may include a display system and an optical system that are supported by a housing. The optical system may be a catadioptric optical system having one or more lens elements. The optical system may include a wave plate stack with one or more wave plates. The display system may also include a wave plate stack with one or more wave plates. Each wave plate stack may include a positive dispersion quarter wave plate and a positive dispersion half wave plate. Each wave plate stack may include a negative dispersion quarter wave plate and a negative dispersion half wave plate. Each wave plate stack may include a biaxial quarter wave plate and a biaxial half wave plate.

17 Claims, 9 Drawing Sheets

(58) Field of Classification Search
USPC ...... 359/13–14, 629–633; 345/7–9; 348/115; 349/11
See application file for complete search history.

(56) References Cited

U.S. PATENT DOCUMENTS

| | | | | |
|---|---|---|---|---|
| 2006/0209239 | A1* | 9/2006 | Lin | H10K 59/8791 349/119 |
| 2017/0125743 | A1 | 5/2017 | Kim et al. | |
| 2019/0377184 | A1 | 12/2019 | Sharp et al. | |
| 2021/0041711 | A1* | 2/2021 | Sharp | G02B 5/3083 |
| 2021/0294012 | A1* | 9/2021 | Wong | G02B 27/0172 |
| 2024/0118473 | A1* | 4/2024 | Beon | G02B 5/3016 |

* cited by examiner

STRAIN-INSENSITIVE WAVE PLATE ARRANGEMENTS

This application claims the benefit of U.S. Provisional Patent Application No. 63/514,939, filed Jul. 21, 2023, which is hereby incorporated by reference herein in its entirety.

BACKGROUND

This relates generally to optical systems and, more particularly, to optical systems with wave plates.

Electronic devices such as head-mounted devices may include optical systems with one or more wave plates. If care is not taken, strain on the wave plates may negatively impact performance of the associated optical system.

SUMMARY

An electronic device may include a display system configured to produce light and a lens module that receives the light from the display system. The lens module may include a lens element having a convex surface and a concave surface, a partially reflective mirror that is interposed between the lens element and the display system, a first negative dispersion half wave plate, wherein the lens element is interposed between the partially reflective mirror and the first negative dispersion half wave plate, and a first negative dispersion quarter wave plate that is interposed between the lens element and the first negative dispersion half wave plate.

An electronic device may include a display system configured to produce light and a lens module that receives the light from the display system. The lens module may include a lens element having a convex surface and a concave surface, a partially reflective mirror that is interposed between the lens element and the display system, a first biaxial half wave plate, wherein the lens element is interposed between the partially reflective mirror and the first biaxial half wave plate, and a first biaxial quarter wave plate that is interposed between the lens element and the first biaxial half wave plate.

A display may include an array of display pixels configured to produce the light, a linear polarizer that is formed over the array of display pixels, a biaxial quarter wave plate, and a biaxial half wave plate that is interposed between the biaxial quarter wave plate and the linear polarizer.

DETAILED DESCRIPTION

Head-mounted devices may be used for virtual reality and augmented reality systems. For example, a pair of virtual reality glasses that is worn on the head of a user may be used to provide a user with virtual reality content and/or augmented reality content.

Figure 1:
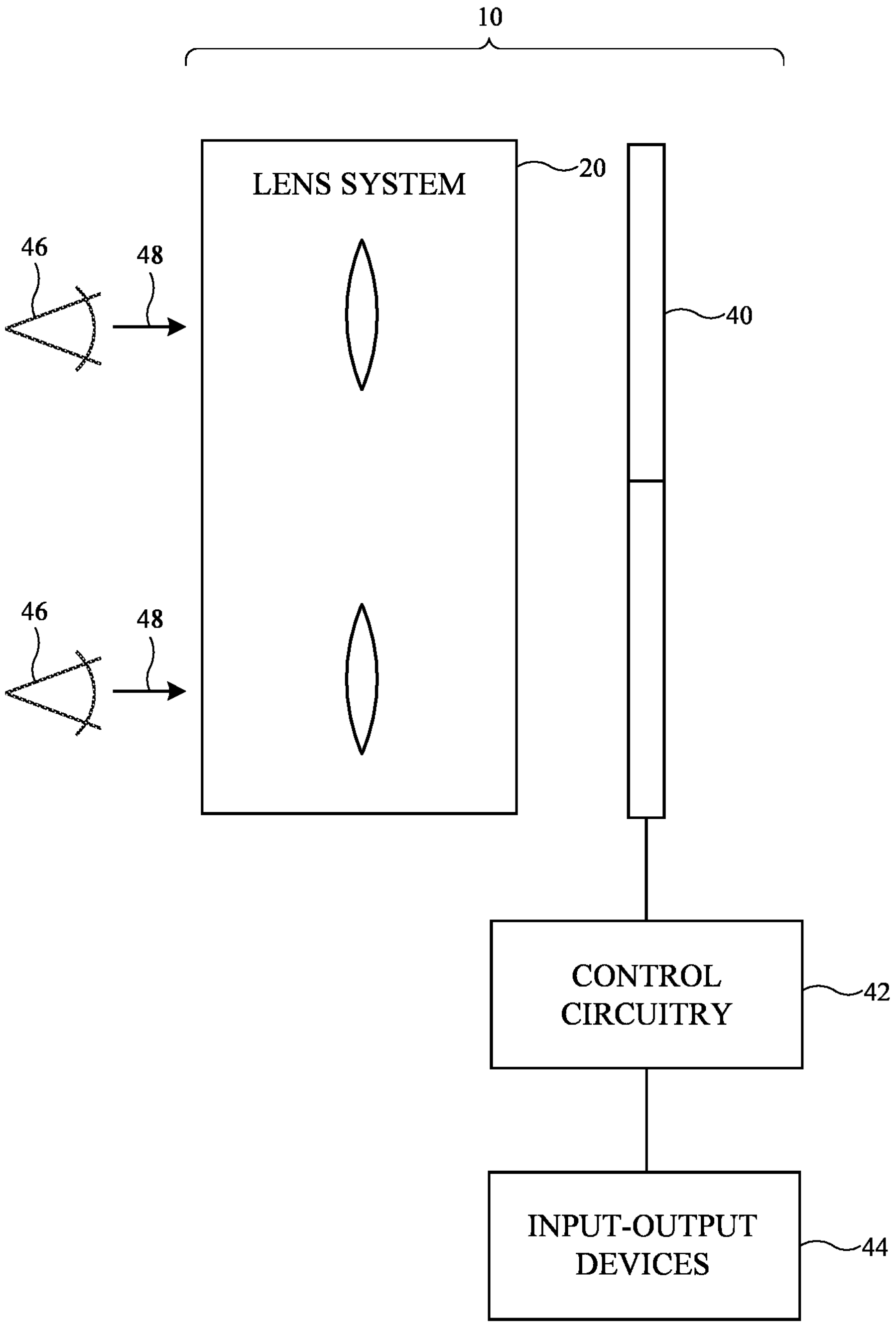
FIG. 1 is a diagram of an illustrative electronic device in accordance with some embodiments.

An illustrative system in which an electronic device (e.g., a head-mounted device such as a pair of virtual reality glasses) is used in providing a user with content such as virtual reality content is shown in FIG. 1. As shown in FIG. 1, virtual reality glasses 10 (sometimes referred to as glasses 10, electronic device 10, head-mounted device 10, head-mounted display 10, etc.) may include a display system such as display system 40 that creates images and may have an optical system such as optical system 20 through which a user (see, e.g., user's eyes 46) may view the images produced by display system 40 by looking in direction 48.

The example of electronic device 10 being a head-mounted device is merely illustrative. In general, electronic device 10 may be any desired electronic device that includes a wave plate (e.g., any electronic device with a display system and/or lens system). As additional examples, electronic device 10 may be a cellular telephone, laptop computer, tablet computer, watch, etc.

Display system 40 (sometimes referred to as display panel 40 or display 40) may be based on a liquid crystal display, an organic light-emitting diode display, an emissive display having an array of crystalline semiconductor light-emitting diode dies, a display with a waveguide, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in glasses (head-mounted device) 10 and/or control circuitry that is mounted outside of device 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images. Illustrative configurations in which control circuitry 42 provides a user with virtual reality content using display system 40 may sometimes be described herein as an example. In general, however, any suitable content may be presented to a user by control circuitry 42 using display system 40 and optical system 20 of device 10.

Input-output devices 44 may be coupled to control circuitry 42. Input-output devices 44 may be used to gather user input from a user, may be used to make measurements on the environment surrounding device 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of device 10, proximity sensors, capacitive touch sensors, strain gauges, gas sensors, pressure sensors, ambient light sensors, and/or other sensors). If desired, input-output devices 44 may include one or more cameras (e.g., cameras for capturing images of the user's surroundings, cameras for performing gaze detection operations by viewing eyes 46, and/or other cameras).

Figure 2:
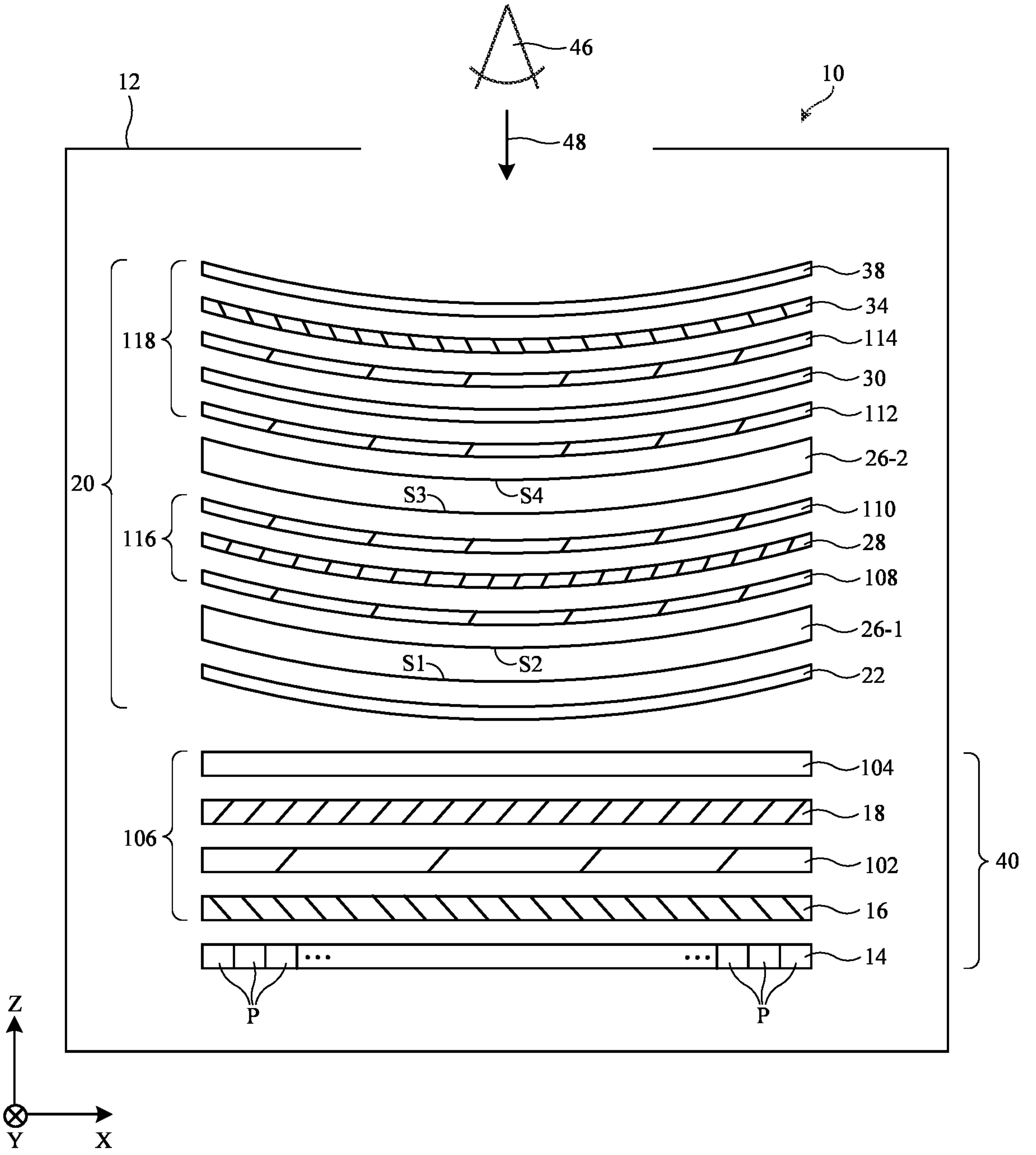
FIG. 2 is a diagram of an illustrative electronic device showing components of an illustrative optical system in the electronic device in accordance with some embodiments.

FIG. 2 is a cross-sectional side view of device 10 showing how optical system 20 and display system 40 may be supported by head-mounted support structures such as housing 12 for device 10. Housing 12 may have the shape of a frame for a pair of glasses (e.g., device 10 may resemble eyeglasses), may have the shape of a helmet (e.g., device 10 may form a helmet-mounted display), may have the shape of a pair of goggles, or may have any other suitable housing shape that allows housing 12 to be worn on the head of a user.

Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other desired configurations.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to device 10 using a cable, wireless connection, or other signal paths.

Display system 40 and the optical components of device 10 may be configured to display images for user 46 using a lightweight and compact arrangement. Optical system 20 may, for example, be based on catadioptric lenses (e.g., lenses that use both reflecting and refracting of light). There may be one lens stack (e.g., optical system 20 in FIG. 2) aligned with each eye of the user while the user wears device 10.

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). A polarizer such as linear polarizer 16 may be placed in front of pixel array 14 and/or may be laminated to pixel array 14 to provide polarized image light. Linear polarizer 16 may have a pass axis aligned with the X-axis of FIG. 2 (as an example). Display system 40 may also include one or more wave plates 18 (sometimes referred to as wave plate stack 18 or quarter wave plate 18) to provide circularly polarized image light. As one example, wave plate stack 18 may include a quarter wave plate. The optical axis (fast axis) of quarter wave plate 18 may be aligned at 45 degrees relative to the pass axis of linear polarizer 16. Quarter wave plate 18 may be mounted in front of polarizer 16 (between polarizer 16 and optical system 20). If desired, quarter wave plate 18 may be attached to polarizer 16 (and display 14) with an adhesive layer such as adhesive 102.

Adhesive layer 102 may be an optically clear adhesive (OCA) layer such as a liquid optically clear adhesive (LOCA) layer. The optically clear adhesive layer 102 may have a high transparency (greater than 80%, greater than 90%, greater than 95%, greater than 99%, greater than 99.9%, etc.) to avoid reducing the efficiency of the system.

An anti-reflective coating 104 may be formed over quarter wave plate 18. Anti-reflective coating 104 (sometimes referred to as coatings 104 or anti-reflective layer 104) may mitigate undesired reflections of ambient light within the system, as one example. Linear polarizer 16, adhesive layer 102, quarter wave plate 18, and anti-reflective layer 104 may collectively be referred to as a display polarizer stack 106. Display system 40 therefore includes pixel array 14 that is covered by display polarizer stack 106 (sometimes referred to as polarizer stack 106, optical layers 106, etc.).

Optical system 20 may include one or more lens elements such as lens elements 26-1 and 26-2. Each lens element may be formed from a transparent material such as plastic or glass. Lens element 26-1 may have a surface S1 that faces display system 40 and a surface S2 that faces the user (e.g. eyes 46). Lens element 26-2 may have a surface S3 that faces display system 40 and a surface S4 that faces the user. Each one of surfaces S1, S2, S3, and S4 may be a convex surface (e.g., a spherically convex surface, a cylindrically convex surface, or an aspherically convex surface), a concave surface (e.g., a spherically concave surface, a cylindrically concave surface, or an aspherically concave surface), or a freeform surface. A freeform surface may include both convex and concave portions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface.

A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. In one illustrative arrangement shown in FIG. 2, surface S1 has convex curvature, surface S2 has concave curvature, surface S3 has convex curvature, and surface S4 has concave curvature. As an example, surface S2 may be cylindrically concave and surface S3 may be cylindrically convex (e.g., surfaces S2 and S3 may be mating cylindrical surfaces). Surface S4 may have aspheric concave curvature.

The example of two lens elements being used in FIG. 2 is merely illustrative. If desired, the optical system may include only one lens element, two lens elements, three lens elements, more than three elements, etc.

Optical structures such as partially reflective coatings, wave plates, reflective polarizers, linear polarizers, antireflection coatings, and/or other optical components may be incorporated into device 10 (e.g., system 20, etc.). These optical structures may allow light rays from display system 40 to pass through and/or reflect from surfaces in optical system 20, thereby providing optical system 20 with a desired lens power.

An illustrative arrangement for the optical layers is shown in FIG. 2. First, the structural arrangement of these layers will be described. The functionality of these layers will be discussed in more detail in connection with FIG. 3.

As shown in FIG. 2, a partially reflective mirror (e.g., a metal mirror coating or other mirror coating such as a dielectric multilayer coating with a 50% transmission and a 50% reflection) such as partially reflective mirror 22 may be formed on the convex surface S1 (e.g., an aspheric convex surface) of lens element 26-1. Partially reflective mirror 22 may sometimes be referred to as beam splitter 22, half mirror 22, or partially reflective layer 22. Partially reflective mirror 22 may transmit between 20% and 80% of light, between 30% and 70% of light, between 40% and 60% of light, between 45% and 55% of light, etc. Partially reflective mirror 22 may reflect between 20% and 80% of light, between 30% and 70% of light, between 40% and 60% of light, between 45% and 55% of light, etc.

One or more wave plates 28 (sometimes referred to as wave plate stack 28 or quarter wave plate 28) may be formed on the concave surface S2 of lens element 26-1. The one or more wave plates may be, in one example, a quarter wave plate that conforms to surface S2 of lens element 26. Retarder 28 may be attached to lens element 26-1 using an adhesive layer 108 (as shown in FIG. 2). In another possible arrangement, retarder 28 may be a coating on surface S2 of lens element 26-1. Retarder 28 may instead be formed on surface S1 of lens element 26-1 if desired. In yet another embodiment, first and second retarder coatings may be formed on surfaces S1 and S2 of lens element 26-1, with the first and second retarder coatings collectively forming a quarter wave plate.

An additional adhesive layer 110 may attach quarter wave plate 28 to surface S3 of lens element 26-2. An adhesive layer 112 couples reflective polarizer 30 to surface S4 of lens element 26-2. Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30.

Linear polarizer 34 may be attached to reflective polarizer 30 using adhesive layer 114. Polarizer 34 may sometimes be referred to as an external blocking linear polarizer 34. Linear polarizer 34 may have a pass axis aligned with the pass axis of reflective polarizer 30. Linear polarizer 34 may have a pass axis that is orthogonal to the pass axis of linear polarizer 16.

One or more additional coatings 38 may also be included in optical system 20 (sometimes referred to as lens 20, lens assembly 20, or lens module 20). Coatings 38 may include an anti-reflective coating (ARC), anti-smudge (AS) coating, or any other desired coatings.

The adhesive layers 108, 110, 112, and 114 may be optically clear adhesive (OCA) layers such as liquid optically clear adhesive (LOCA) layers. The optically clear adhesive layers may have a high transparency (greater than 80%, greater than 90%, greater than 95%, greater than 99%, greater than 99.9%, etc.) to avoid reducing the efficiency of the system.

Figure 3:
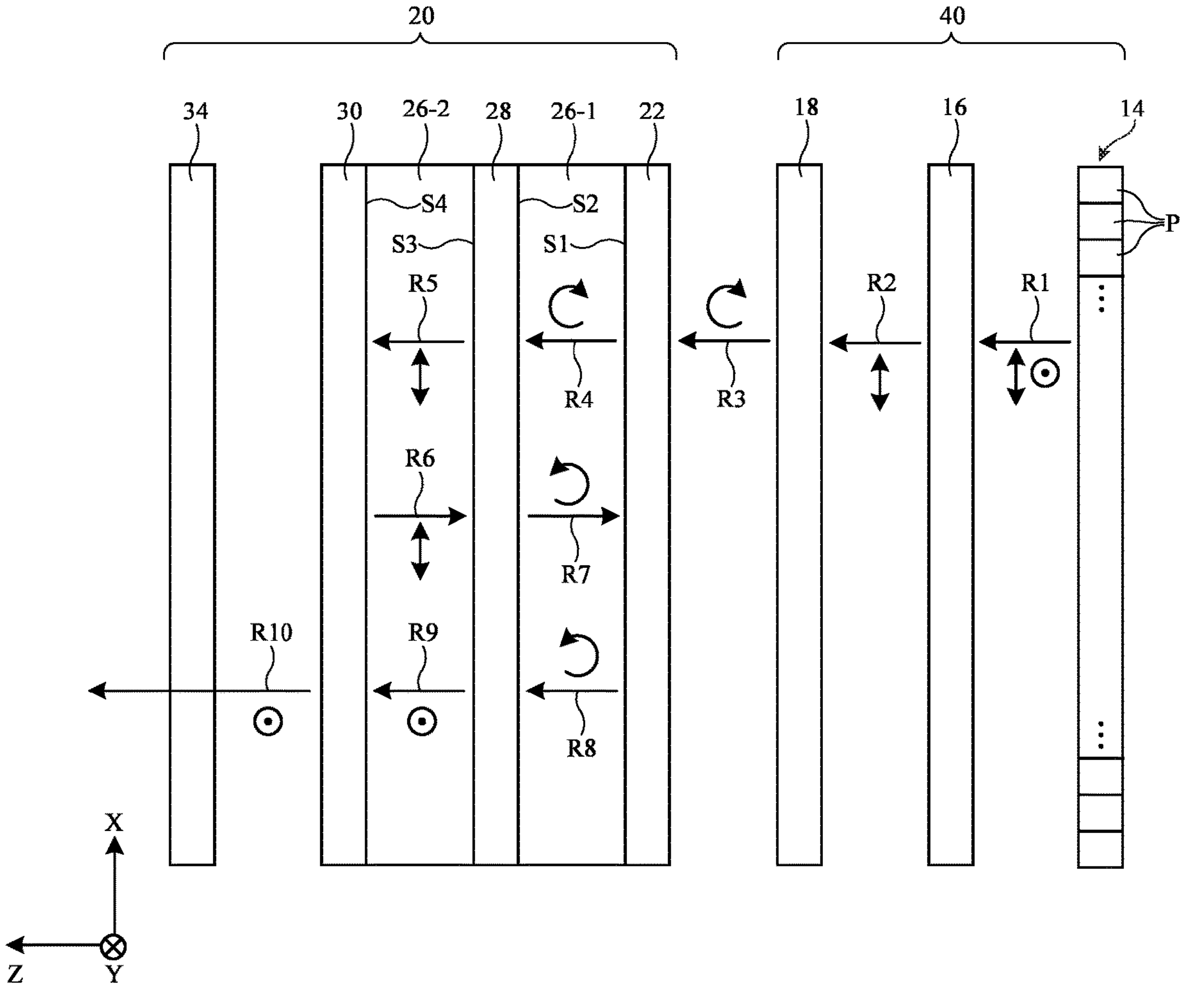
FIG. 3 is a cross-sectional side view of an illustrative electronic device showing how the polarization of light changes when passing through the optical system of FIG. 2 in accordance with some embodiments.

FIG. 3 is a cross-sectional side view of an illustrative optical system 20 and display system 40 showing how light from the display passes through the optical system of FIG. 2. Note that the adhesive layers as well as coatings 38 and 104 are not shown in FIG. 3 since these layers do not appreciably impact the polarization of light travelling through the system. As shown in FIG. 3, a light ray R1 may be emitted from display 14. Light ray R1 exits display 14 having a mix of polarization states. As image light ray R1 exits display 14 and passes through linear polarizer 16, ray R1 becomes linearly polarized in alignment with the pass axis of linear polarizer 16. The pass axis of linear polarizer 16 may be, for example, aligned with the X-axis of FIG. 3. After passing through polarizer 16, ray R2 passes through wave plate 18, which may be a quarter wave plate. As ray R2 passes through wave plate stack 18, ray R3 exits the wave plate stack circularly polarized (e.g., with a clockwise circular polarization).

When circularly polarized ray R3 strikes partially reflective mirror 22, a portion of ray R3 will pass through partially reflective mirror 22 to become reduced-intensity ray R4. Ray R4 will be refracted (partially focused) by the shape of convex surface S1 of lens element 26-1. It should be noted that the depictions of surfaces of S1, S2, S3, and S4 as planar in FIG. 3 are merely illustrative. In practice, surfaces S1, S2, S3, and S4 may be curved as shown and discussed in connection with FIG. 2.

Wave plate stack 28 may convert the circular polarization of ray R4 into linear polarization. Wave plate stack 28 may, for example, convert circularly polarized ray R4 into a ray R5 with a linear polarization aligned with the X-axis of FIG. 2. Ray R5 may optionally be refracted (partially focused) by the shape of surface S3 of lens element 26-2 and/or the shape of surface S2 of lens element 26-1. Wave plate stack 28 in optical system 20 may be rotated 90 degrees relative to wave plate stack 18 in display 40. Other arrangements for wave plate stacks 28 and 18 may be used, as will be discussed later in greater detail.

As previously mentioned, reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30. In the illustrative arrangement of FIG. 3, reflective polarizer 30 has a reflection axis that is aligned with the X-axis and a pass axis that is aligned with the Y-axis, so ray R5 will reflect from reflective polarizer 30 as reflected ray R6. It should be noted that the pass axis of reflective polarizer 30 is orthogonal to the pass axis of linear polarizer 16 in display system 40.

Reflected ray R6 has a linear polarization aligned with the X-axis. After passing through quarter wave plate 28, the linear polarization of ray R6 will be converted into circular polarization (i.e., ray R6 will become counter-clockwise circularly polarized ray R7).

Circularly polarized ray R7 will travel through lens element 26-1 and a portion of ray R7 will be reflected in the positive Z direction by the partially reflective mirror 22 on the convex surface S1 of lens element 26-1 as reflected ray R8. The reflection from the curved shape of surface S1 provides optical system 20 with additional optical power.

Ray R8 from partially reflective mirror 22 is converted from circularly polarized light to linearly polarized light ray R9 by wave plate stack 28. Passing through the curved surface S4 of lens element 26-2 may provide optical system 20 with additional optical power (e.g., refractive optical power). The linear polarization of ray R9 is aligned with the Y-axis, which is parallel to the pass axis of reflective polarizer 30. Accordingly, ray R9 will pass through reflective polarizer 30 as ray R10 to provide a viewable image to the user.

Linear polarizer 34 has a pass axis aligned with the pass axis of reflective polarizer 30 (i.e., parallel to the Y-axis in this example) so that any light from the external environment will be polarized by linear polarizer 34 such that light is not reflected by the reflective polarizer 30. Ambient light (e.g., light not from pixel array 14) that is transmitted by the linear polarizer 34 and the reflective polarizer 30 will pass through wave plate stacks 28 and 18 and be absorbed by linear polarizer 16. Linear polarizer 34 has a pass axis (parallel to the Y-axis) that is orthogonal to the pass axis (parallel to the X-axis) of linear polarizer 16 in the display.

The optical system 20 may be formed as a single, solid lens assembly without any intervening air gaps. The retardation provided by wave plate stack 28 across the entire wave plate stack may be uniform within 20%, within 10%, within 5%, within 3%, within 2%, within 1%, etc. Similarly, the thickness 62 of wave plate stack 28 across the entire wave plate stack may be uniform within 20%, within 10%, within 5%, within 3%, within 2%, within 1%, etc. In other words, the retardation variation across the wave plate stack is no more than 20%, no more than 10%, no more than 5%, no more than 3%, no more than 2%, no more than 1%, etc. The thickness variation across the wave plate stack is no more than 20%, no more than 10%, no more than 5%, no more than 3%, no more than 2%, no more than 1%, etc.

Wave plate stack 28 may be formed from any desired materials using any desired processes. As one example, wave plate stack 28 may be formed from a liquid crystal material that is deposited over a photo-aligned alignment layer. As another example, wave plate stack 28 may be formed from a liquid crystal material that is aligned using shear alignment. As yet another example, wave plate stack 28 may be formed from an inorganic material using oblique deposition. The materials for wave plate stack 28 may be deposited using spin coating, die coating, spray coating, physical vapor deposition (PVD), or any other desired techniques. As another example, wave plate stack 28 may be formed by a polymer film that is stretched along one axis to induce birefringence.

The example of a material having a uniform birefringence and relatively uniform birefringence being used to form the retarder is merely illustrative. Any type of retarder that provides uniform retardation may be used. As one example, the retarder may have a first thickness and a first birefringence in a first portion. The retarder may have a second thickness and a second birefringence in a second portion. The second birefringence may be different than the first birefringence and the second thickness may be different than the first thickness. However, the retardation may be the same in both portions. In other words, the retarder may be provided with different birefringence in different portions that are compensated by different thicknesses in the different portions to provide uniform retardation. These types of techniques may be used to provide uniform retardation even when uniform thickness is not practical from a manufacturing standpoint.

Adhesive layer 108, wave plate stack 28, and adhesive layer 110 may sometimes collectively be referred to as a wave plate stack 116 or retarder stack 116. Adhesive layer 112, reflective polarizer 30, adhesive layer 114, linear polarizer 34, and anti-reflective coating 38 may collectively be referred to as the lens polarizer stack 118.

The positions of the wave plate stacks in FIG. 2 are merely illustrative. The wave plate stacks may be formed at other locations within the electronic device. For example, wave plate stack 28 may instead be formed between partially reflective layer 22 and lens element 26-1 or between lens element 26-2 and reflective polarizer 30.

When a wave plate (such as in wave plate stack 28 in FIG. 2) is curved, the wave plate may be subject to strain. If care is not taken, the strain on the wave plate may cause retardation drop in the wave plate, which causes poor ellipticity and undesirably reduces contrast within the system. To mitigate these types of issues, it is desirable for the one or more wave plates in wave plate stack 28 to be insensitive to strain. In other words, the wave plate stack may desirably have uniform ellipticity even after being curved/strained.

To achieve this type of strain-insensitivity, arrangements of the type shown in FIGS. 4-7 may be used. As shown in FIG. 4A, the one or more waveplates 28 may include a positive dispersion half wave plate (HWP) 132 and a positive dispersion quarter wave plate (QWP) 134. Similarly, as shown in FIG. 4B, the one or more waveplates 18 may include a positive dispersion quarter wave plate (QWP) 140 and a positive dispersion half wave plate (HWP) 142.

In positive dispersion materials, a magnitude of birefringence decreases with increasing wavelength. In contrast, a negative dispersion material has a reverse birefringence dispersion, with the magnitude of birefringence ($\Delta n$) increasing with increasing wavelength.

The optical axes of QWPs 134 and 140 as well as HWPs 132 and 142 may be selected such that the HWPs compensate for the QWPs (and vice versa). The angles of the optical axes (e.g., relative to the absorption axis of linear polarizer 16, which is equivalent to the pass axis of reflective polarizer 30 and linear polarizer 34, which is equivalent to the Y-axis)

may satisfy the equation $|\beta-2\alpha|=\pi/4, 3\pi/4, 5\pi/4, \ldots$ where $\beta$ is the angle of the optical axes of the QWP and a is the angle of the optical axes of the HWP.

Figure 4A:
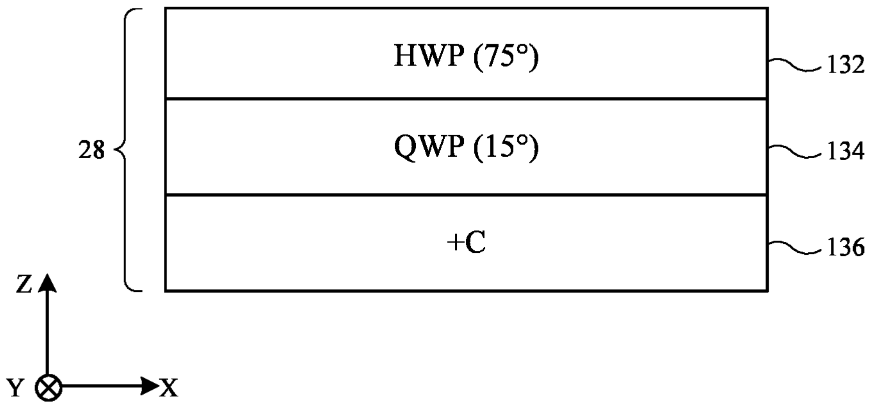
FIG. 4A is a side view of an illustrative wave plate stack in a lens module with a positive dispersion half wave plate and a positive dispersion quarter wave plate in accordance with some embodiments.

In FIG. 4A, QWP 134 has an optical axis at an angle of 15 degrees (e.g., relative to the Y-axis) and HWP 132 has an optical axis at an angle of 75 degrees (relative to the Y-axis). In other words, the optical axis of QWP 134 and the optical axis of HWP 132 are separated by an angle of 60 degrees. Using these angles satisfies the aforementioned equation (e.g., abs $(+15°-2*(+75°))=135°=3\pi/4$).

Figure 4B:
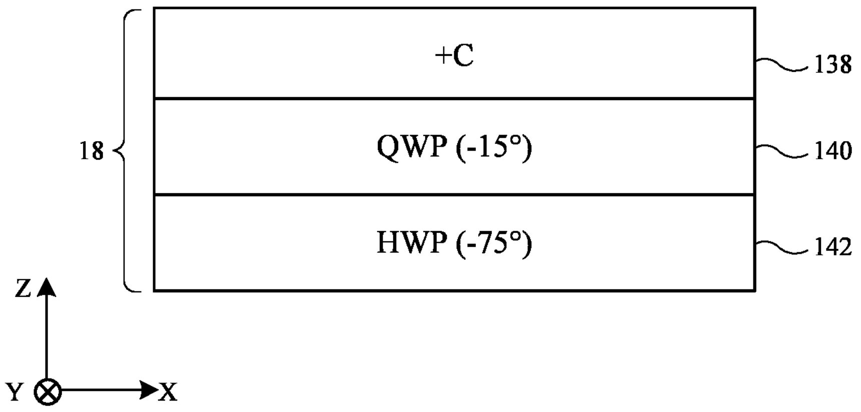
FIG. 4B is a side view of an illustrative wave plate stack in a display system with a positive dispersion half wave plate and a positive dispersion quarter wave plate in accordance with some embodiments.

In FIG. 4B, QWP 140 has an optical axis at an angle of −15 degrees (e.g., relative to the Y-axis) and HWP 142 has an optical axis at an angle of −75 degrees (relative to the Y-axis). In other words, the optical axis of QWP 140 and the optical axis of HWP 142 are separated by an angle of 60 degrees. Using these angles satisfies the aforementioned equation (e.g., abs $(-15°-2*(-75°))=135°=3\pi/4$).

Using the wave plates and optical axes described in connection with FIGS. 4A and 4B may reduce sensitivity of the wave plate stacks to strain. The HWP and QWP in each wave plate stack are self-compensating. In other words, a change in retardation caused by strain in QWP 134 is compensated by a corresponding change in retardation caused by strain in HWP 132. The overall output of the wave plate stack therefore has a more uniform ellipticity (e.g., the output light is closer to being uniformly circular polarized) than if only a single quarter wave plate is used.

As shown in FIG. 4A, the one or more wave plates 28 may optionally include a positive C-plate 136. Similarly, the one or more wave plates 18 may optionally include a positive C-plate 138.

HWP 132, QWP 134, QWP 140, and HWP 142 may be A-plates. A-plates have an optical axis (e.g., parallel to the extraordinary axis of the wave plate) that is parallel to the plane of the plate (e.g., within the XY-plane in FIGS. 4A and 4B). In contrast, C-plates have an optical axis that is perpendicular to the plane of the plate (e.g., parallel to the Z-axis of FIGS. 4A and 4B). In a positive C-plate, the refractive index along the Z-axis (e.g., orthogonal to the plane of the plate) is larger than refractive indices along the X and Y axes (e.g., within the plane of the plate). In a negative C-plate, the refractive index along the Z-axis (e.g., orthogonal to the plane of the plate) is smaller than refractive indices along the X and Y axes (e.g., within the plane of the plate). In both positive C-plates and negative C-plates, the refractive index along the X-axis is equal to the refractive index along the Y-axis.

The +C plate 136 in FIG. 4A compensates for the viewing angle dependence of HWP 132 and QWP 134. Similarly, the +C plate 138 in FIG. 4B compensates for the viewing angle dependence of QWP 140 and HWP 142. By including the +C plates, the system of FIGS. 4A and 4B has more brightness and color uniformity across viewing angles.

Including +C plates as in FIGS. 4A and 4B is optional and the +C plate may be omitted from the wave plate stack of FIG. 4A and/or the wave plate stack of FIG. 4B.

When the one or more wave plates 28 from FIG. 4A are incorporated into electronic device 10, positive C-plate 136 may be directly adjacent and in direct contact with adhesive layer 108 whereas HWP 132 may be directly adjacent an in direct contact with adhesive layer 110. When positive C-plate 136 is omitted, QWP 134 may be directly adjacent and in direct contact with adhesive layer 108. These examples are merely illustrative. In general, positive C-plate 136 (or QWP 134 when positive C-plate 136 is omitted) may be directly adjacent to and in direct contact with any desired component (e.g., a lens element such as lens element 26-1, partially reflective layer 22, etc.). Similarly, HWP 132 may be directly adjacent to and in direct contact with any desired component (e.g., a lens element such as lens element 26-2, reflective polarizer 30, etc.).

Each layer in the one or more wave plates 28 may have a high transparency (greater than 80%, greater than 90%, greater than 95%, greater than 99%, greater than 99.9%, etc.) to avoid reducing the efficiency of the system.

When the one or more wave plates 18 from FIG. 4B are incorporated into electronic device 10, HWP 142 may be directly adjacent and in direct contact with adhesive layer 102 whereas positive C-plate 138 may be directly adjacent an in direct contact with anti-reflective coating 104. When positive C-plate 138 is omitted, QWP 140 may be directly adjacent and in direct contact with anti-reflective coating 104. These examples are merely illustrative. In general, HWP 142 may be directly adjacent to and in direct contact with any desired component (e.g., the pixel array, a linear polarizer, an additional wave plate, etc.). Positive C-plate 138 (or QWP 140 when positive C-plate 138 is omitted) may be directly adjacent to and in direct contact with any desired component.

Each layer in the one or more wave plates 18 may have a high transparency (greater than 80%, greater than 90%, greater than 95%, greater than 99%, greater than 99.9%, etc.) to avoid reducing the efficiency of the system.

In FIGS. 4A and 4B, HWP 132, QWP 134, QWP 140, and HWP 142 are formed from positive dispersion materials. In another possible arrangement, shown in FIGS. 5A and 5B, HWP 132, QWP 134, QWP 140, and HWP 142 may be formed from a negative dispersion material that has a reverse birefringence dispersion (with the magnitude of birefringence ($\Delta n$) increasing with increasing wavelength).

Figure 5A:
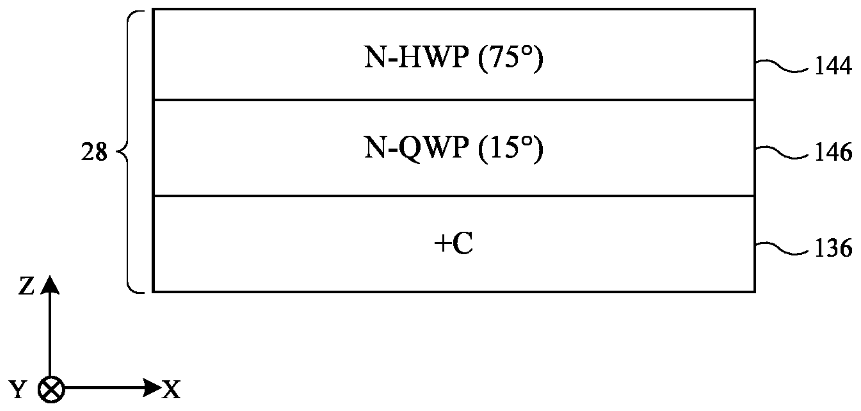
FIG. 5A is a side view of an illustrative wave plate stack in a lens module with a negative dispersion half wave plate and a negative dispersion quarter wave plate in accordance with some embodiments.

As shown in FIG. 5A, the one or more waveplates 28 may include a negative dispersion half wave plate (N-HWP) 144 and a negative dispersion quarter wave plate (N-QWP) 146. Similarly, as shown in FIG. 5B, the one or more waveplates 18 may include a negative dispersion half wave plate (N-QWP) 148 and a negative dispersion half wave plate (N-HWP) 150.

The optical axes of N-QWPs 146 and 148 as well as N-HWPs 144 and 150 may be selected such that the N-HWPs compensate for the N-QWPs (and vice versa). The angles of the optical axes (e.g., relative to the absorption axis of linear polarizer 16 or the Y-axis) may satisfy the equation $|\beta-2\alpha|=\pi/4, 3\pi/4, 5\pi/4, \ldots$ where $\beta$ is the angle of the optical axes of the N-QWP and $\alpha$ is the angle of the optical axes of the N-HWP.

In FIG. 5A, N-QWP 146 has an optical axis at an angle of 15 degrees (e.g., relative to the Y-axis) and N-HWP 144 has an optical axis at an angle of 75 degrees (relative to the Y-axis). In other words, the optical axis of N-QWP 146 and the optical axis of N-HWP 144 are separated by an angle of 60 degrees. Using these angles satisfies the aforementioned equation (e.g., abs $(+15°-2*(+75°))=135°=3\pi/4$).

Figure 5B:
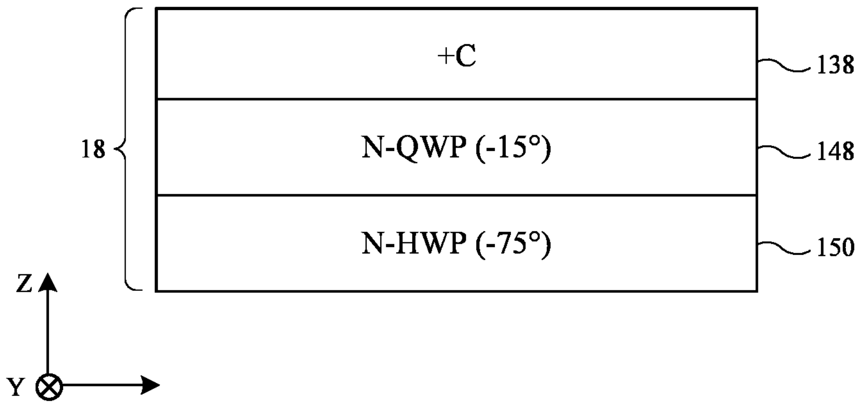
FIG. 5B is a side view of an illustrative wave plate stack in a display system with a negative dispersion half wave plate and a negative dispersion quarter wave plate in accordance with some embodiments.

In FIG. 5B, N-QWP 148 has an optical axis at an angle of −15 degrees (e.g., relative to the Y-axis) and N-HWP 150 has an optical axis at an angle of −75 degrees (relative to the Y-axis). In other words, the optical axis of N-QWP 148 and the optical axis of N-HWP 150 are separated by an angle of 60 degrees. Using these angles satisfies the aforementioned equation (e.g., abs $(-15°-2*(-75°))=135°=3\pi/4$).

Similar to as with FIGS. 4A and 4B, The N-HWP and N-QWP in each wave plate stack of FIGS. 5A and 5B are self-compensating. In other words, a change in retardation caused by strain in N-QWP 146 is compensated by a corresponding change in retardation caused by strain in N-HWP 144. The overall output of the wave plate stack therefore has a more uniform ellipticity (e.g., the output light is closer to being uniformly circular polarized) than if only a single quarter wave plate is used. Moreover, using the negative dispersion wave plates described in connection with FIGS. 5A and 5B may improve color uniformity relative to the arrangements of FIGS. 4A and 4B with positive dispersion wave plates.

As shown in FIGS. 5A and 5B, the one or more wave plates 28 may optionally include a positive C-plate 136. Similarly, the one or more wave plates 18 may optionally include a positive C-plate 138. By including the +C plates, the display has more brightness and color uniformity across viewing angles. Including +C plates as in FIGS. 5A and 5B is optional and the +C plate may be omitted from the wave plate stack of FIG. 5A and/or the wave plate stack of FIG. 5B.

When the one or more wave plates 28 from FIG. 5A are incorporated into electronic device 10, positive C-plate 136 may be directly adjacent and in direct contact with adhesive layer 108 whereas N-HWP 144 may be directly adjacent an in direct contact with adhesive layer 110. When positive C-plate 136 is omitted, N-QWP 146 may be directly adjacent and in direct contact with adhesive layer 108. These examples are merely illustrative. In general, positive C-plate 136 (or N-QWP 146 when positive C-plate 136 is omitted) may be directly adjacent to and in direct contact with any desired component (e.g., a lens element such as lens element 26-1, partially reflective layer 22, etc.). Similarly, N-HWP 144 may be directly adjacent to and in direct contact with any desired component (e.g., a lens element such as lens element 26-2, reflective polarizer 30, etc.).

Each layer in the one or more wave plates 28 may have a high transparency (greater than 80%, greater than 90%, greater than 95%, greater than 99%, greater than 99.9%, etc.) to avoid reducing the efficiency of the system.

When the one or more wave plates 18 from FIG. 5B are incorporated into electronic device 10, N-HWP 150 may be directly adjacent and in direct contact with adhesive layer 102 whereas positive C-plate 138 may be directly adjacent an in direct contact with anti-reflective coating 104. When positive C-plate 138 is omitted, N-QWP 148 may be directly adjacent and in direct contact with anti-reflective coating 104. These examples are merely illustrative. In general, N-HWP 150 may be directly adjacent to and in direct contact with any desired component (e.g., the pixel array, a linear polarizer, an additional wave plate, etc.). Positive C-plate 138 (or N-QWP 148 when positive C-plate 138 is omitted) may be directly adjacent to and in direct contact with any desired component.

Each layer in the one or more wave plates 18 may have a high transparency (greater than 80%, greater than 90%, greater than 95%, greater than 99%, greater than 99.9%, etc.) to avoid reducing the efficiency of the system.

In FIGS. 4 and 5, each one of wave plates 132, 134, 136, 138, 140, 142, 144, 146, 148, and 150 is a uniaxial wave plate. In a uniaxial plate, the refractive index along at least two of the X-axis (which is within the plane of the plate), the Y-axis (which is within the plane of the plate and orthogonal to the X-axis), and the Z-axis (e.g., which is orthogonal to the plane of the plate) are equal. For example, in a positive C-plate, $n_x=n_y<n_z$ (where $n_x$ is the refractive index along the X-axis, $n_y$ is the refractive index along the Y-axis, and $n_z$ is the refractive index along the Z-axis). As additional examples, uniaxial quarter wave plates and half wave plates may have a refractive index relationship of $n_x>n_y=n_z$ or $n_x=n_z>n_y$.

Instead of using a uniaxial wave plate for the quarter wave plates and half wave plates (as in FIGS. 4 and 5), the quarter wave plates and half wave plates may be biaxial wave plates. One example of a biaxial wave plate is a Z-plate, where $n_x>n_z>n_y$. Additional examples of biaxial wave plates are a positive B-plate (where $n_z>n_x>n_y$) and a negative B-plate (where $n_x>n_y>n_z$).

Figure 6A:
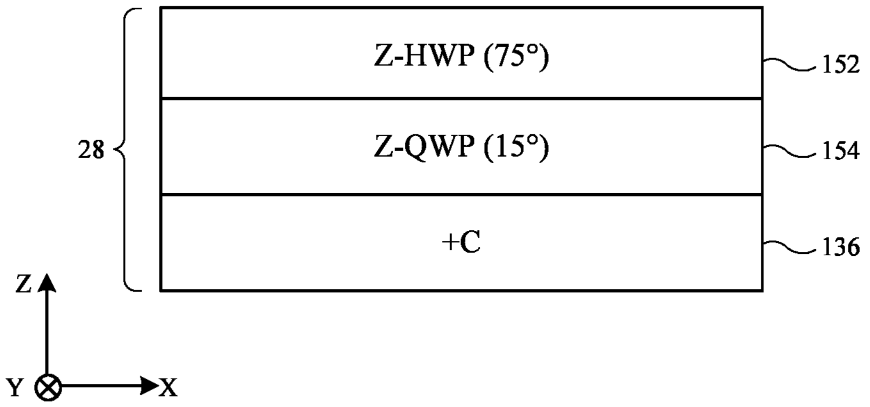
FIG. 6A is a side view of an illustrative wave plate stack in a lens module with a biaxial half wave plate and a biaxial quarter wave plate in accordance with some embodiments.
Figure 6B:
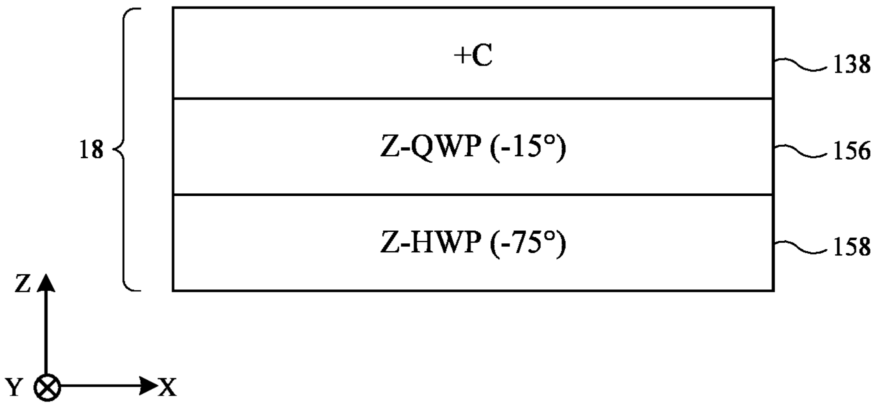
FIG. 6B is a side view of an illustrative wave plate stack in a display system with a biaxial half wave plate and a biaxial quarter wave plate in accordance with some embodiments.

As shown in FIG. 6A, the one or more waveplates 28 may include a half wave plate 152 that is a biaxial wave plate, specifically a Z-plate (Z-HWP). The one or more waveplates 28 may include a quarter wave plate 154 that is a biaxial wave plate, specifically a Z-plate (Z-QWP). Similarly, as shown in FIG. 6B, the one or more waveplates 18 may include a half wave plate 158 that is a biaxial wave plate, specifically a Z-plate (Z-HWP). The one or more waveplates 18 may include a quarter wave plate 156 that is a biaxial wave plate, specifically a Z-plate (Z-QWP).

The optical axes of Z-QWPs 154 and 156 as well as Z-HWPs 152 and 158 may be selected such that the Z-HWPs compensate for the Z-QWPs (and vice versa). The angles of the optical axes (e.g., relative to the absorption axis of linear polarizer 16 which is equivalent to the Y-axis) may satisfy the equation $|\beta-2\alpha|=\pi/4, 3\pi/4, 5\pi/4, \ldots$ where $\beta$ is the angle of the optical axes of the Z-QWP and a is the angle of the optical axes of the Z-HWP.

In FIG. 6A, Z-QWP 154 has an optical axis at an angle of 15 degrees (e.g., relative to the Y-axis) and Z-HWP 152 has an optical axis at an angle of 75 degrees (relative to the Y-axis). In other words, the optical axis of Z-QWP 154 and the optical axis of Z-HWP 152 are separated by an angle of 60 degrees. Using these angles satisfies the aforementioned equation (e.g., abs $(+15°-2*(+75°))=135°=3\pi/4$).

This example is merely illustrative. In another possible arrangement, Z-QWP 154 has an optical axis at an angle of 75 degrees (e.g., relative to the Y-axis) and Z-HWP 152 has an optical axis at an angle of 15 degrees (relative to the Y-axis). Using these angles satisfies the aforementioned equation (e.g., abs $(+75°-2*(+15°))=45°=\pi/4$). Using these angles may improve contrast relative to the example where Z-QWP 154 has an optical axis at an angle of 15 degrees and Z-HWP 152 has an optical axis at an angle of 75 degrees.

In FIG. 6B, Z-QWP 156 has an optical axis at an angle of −15 degrees (e.g., relative to the Y-axis) and Z-HWP 158 has an optical axis at an angle of −75 degrees (relative to the Y-axis). In other words, the optical axis of Z-QWP 156 and the optical axis of Z-HWP 158 are separated by an angle of 60 degrees. Using these angles satisfies the aforementioned equation (e.g., abs $(-15°-2*(-75°))=135°=3\pi/4$).

Similar to as with FIGS. 4 and 5, the Z-HWP and Z-QWP in each wave plate stack of FIGS. 6A and 6B are self-compensating. In other words, a change in retardation caused by strain in Z-QWP 154 is compensated by a corresponding change in retardation caused by strain in Z-HWP 152. The overall output of the wave plate stack therefore has a more uniform ellipticity (e.g., the output light is closer to being uniformly circular polarized) than if only a single quarter wave plate is used. Moreover, using the biaxial wave plates described in connection with FIGS. 6A and 6B may improve off-angle compensation relative to the arrangements of FIGS. 4 and 5 with uniaxial wave plates.

As shown in FIGS. 6A and 6B, the one or more wave plates 28 may optionally include a positive C-plate 136. Similarly, the one or more wave plates 18 may optionally include a positive C-plate 138. By including the +C plates, the display has more brightness and color uniformity across viewing angles. Including +C plates as in FIGS. 6A and 6B is optional and the +C plate may be omitted from the wave plate stack of FIG. 6A and/or the wave plate stack of FIG. 6B.

When the one or more wave plates 28 from FIG. 6A are incorporated into electronic device 10, positive C-plate 136 may be directly adjacent and in direct contact with adhesive layer 108 whereas Z-HWP 152 may be directly adjacent an in direct contact with adhesive layer 110. When positive C-plate 136 is omitted, Z-QWP 154 may be directly adjacent and in direct contact with adhesive layer 108. These examples are merely illustrative. In general, positive C-plate 136 (or Z-QWP 154 when positive C-plate 136 is omitted) may be directly adjacent to and in direct contact with any desired component (e.g., a lens element such as lens element 26-1, partially reflective layer 22, etc.). Similarly, Z-HWP 152 may be directly adjacent to and in direct contact with any desired component (e.g., a lens element such as lens element 26-2, reflective polarizer 30, etc.).

Each layer in the one or more wave plates 28 may have a high transparency (greater than 80%, greater than 90%, greater than 95%, greater than 99%, greater than 99.9%, etc.) to avoid reducing the efficiency of the system.

When the one or more wave plates 18 from FIG. 6B are incorporated into electronic device 10, Z-HWP 158 may be directly adjacent and in direct contact with adhesive layer 102 whereas positive C-plate 138 may be directly adjacent an in direct contact with anti-reflective coating 104. When positive C-plate 138 is omitted, Z-QWP 156 may be directly adjacent and in direct contact with anti-reflective coating 104. These examples are merely illustrative. In general, Z-HWP 158 may be directly adjacent to and in direct contact with any desired component (e.g., the pixel array, a linear polarizer, an additional wave plate, etc.). Positive C-plate 138 (or Z-QWP 156 when positive C-plate 138 is omitted) may be directly adjacent to and in direct contact with any desired component.

Each layer in the one or more wave plates 18 may have a high transparency (greater than 80%, greater than 90%, greater than 95%, greater than 99%, greater than 99.9%, etc.) to avoid reducing the efficiency of the system.

It is noted that each one of the wave plate stacks may be incorporated into electronic device 10 as shown in FIG. 2 or any other desired type of electronic device. Each wave plate stack (and, correspondingly, each plate within the wave plate stack) may have curvature. Each plate in the wave plate stack may be curved along one axis or along two axes. When the plate is curved along two axes (e.g., in both the X-direction and the Y-direction), the plate may be referred to as having compound curvature.

The strain-insensitive wave plate stacks described herein may be particularly beneficial in any device in which a wave plate undergoes strain. A wave plate stack that conforms to a lens in a head-mounted device is just one possible example of a wave plate that undergoes strain. As another example, a flexible display may undergo strain during bending (e.g., folding and unfolding). In this case, the strain-insensitive wave plate stacks described herein may be used to improve display performance. As yet another example, a rigid display may undergo strain during thermal cycling (e.g., due to shrinking and expanding of the wave plates during the thermal cycling). In this case, the strain-insensitive wave plate stacks described herein may be used to improve display performance.

Figure 7:
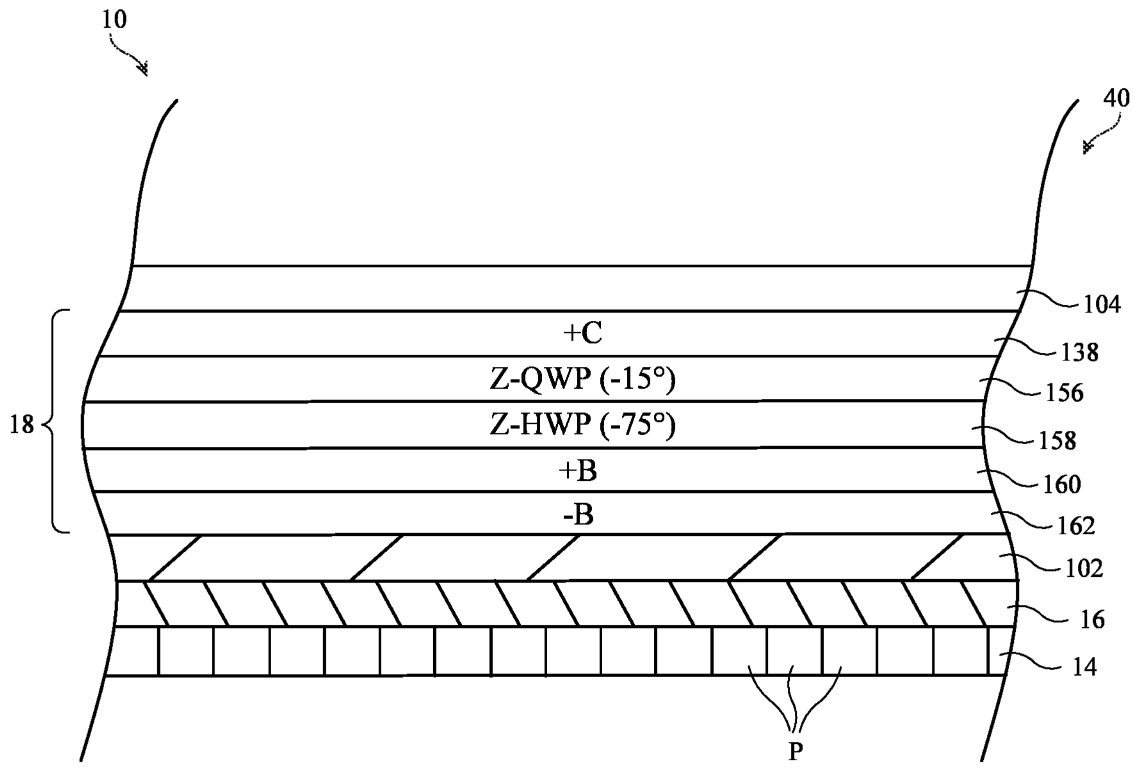
FIG. 7 is a side view of an illustrative display system with a wave plate stack having a biaxial half wave plate and a biaxial quarter wave plate in accordance with some embodiments.

FIG. 7 is a cross-sectional side view of an illustrative electronic device 10 with a display 40 that includes a strain-insensitive wave plate stack. Display 40 may be a standalone display (e.g., for a cellular telephone, laptop computer, tablet computer, etc.) or may emit light through lenses of a head-mounted device. Display 40 may be rigid or flexible.

As shown in FIG. 7, a linear polarizer 16 is formed over pixels P of pixel array 14. Pixel array 14 may be organic light-emitting diode pixels, liquid crystal pixels, microLED pixels, or any other desired type of pixels. Similar to as shown and discussed in connection with FIG. 2, wave plate stack 18 is interposed between adhesive layer 102 and anti-reflective layer 104. Any of the wave plate stacks described herein (e.g., from FIG. 4-6) may be used for the wave plate stack of FIG. 7.

FIG. 7 specifically shows an example where the wave plate stack of FIG. 6B is used (with a positive C-plate 138, a Z-QWP 156, and a Z-HWP 158). C-plate 138 may be omitted in FIG. 7 if desired. Additionally, FIG. 7 shows how a positive B-plate 160 and a negative B-plate 162 may optionally be included in the wave plate stack. The B-plates may be interposed between Z-HWP 158 and linear polarizer 16. The positive B-plate 160 and the negative B-plate 162 may be used for off-angle compensation and may optionally be included in any of the wave plate stacks 18/28 of FIGS. 4-6.

In the aforementioned examples of FIGS. 4-7, each wave plate (e.g., QWPs, HWPs, C-plates, B-plates, etc.) may be formed from a film, a liquid crystal layer, or any other desired material. Each polarizer may be formed from a coating or as a stretched polarizer (e.g., formed from polyvinyl alcohol doped with iodine).

Figure 8:
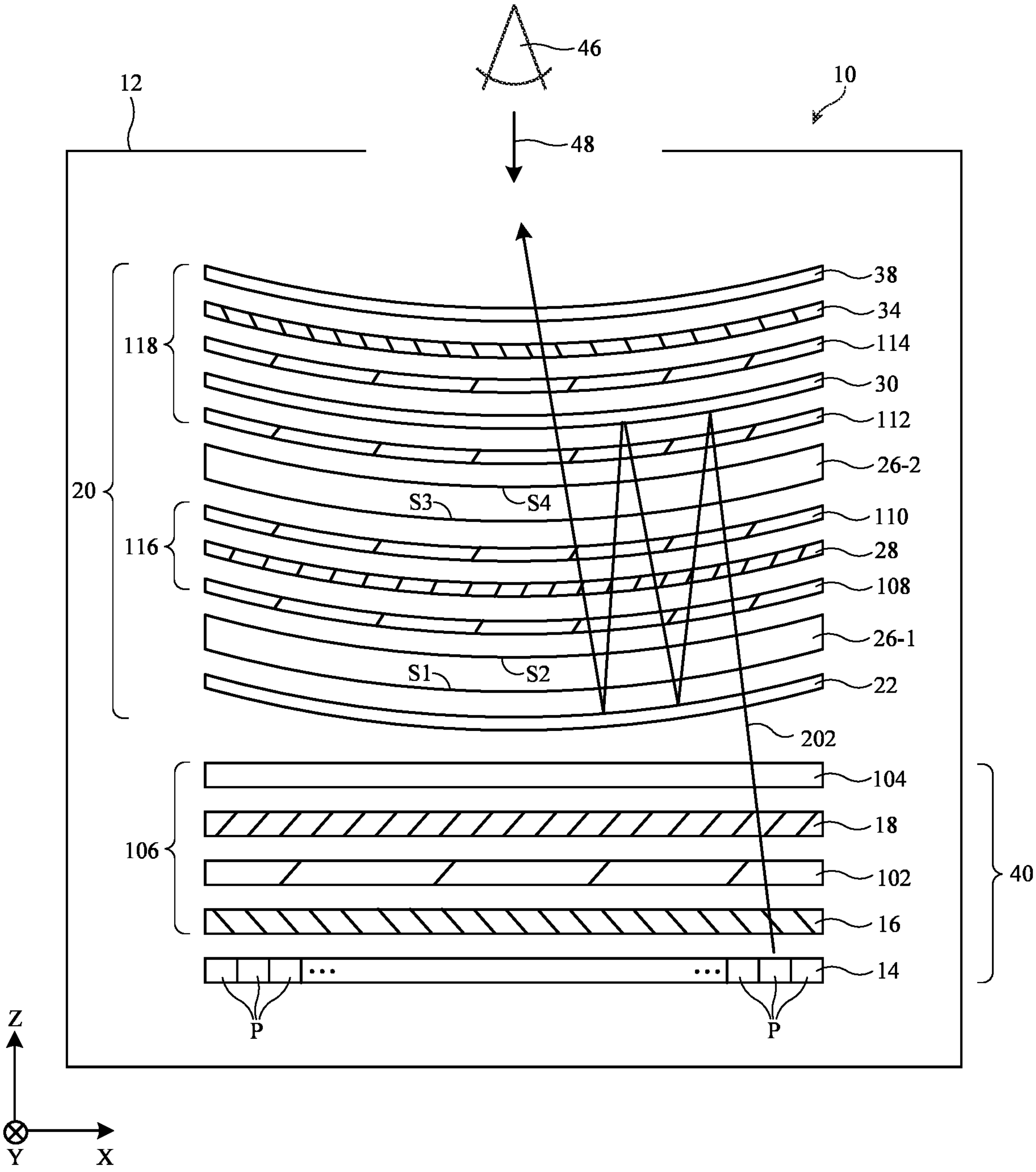
FIG. 8 is a diagram of an illustrative electronic device showing components of an illustrative optical system in the electronic device and a double bounce artifact that may occur within the optical system in accordance with some embodiments.

One type of artifact that may be present in catadioptric systems of the type shown in FIG. 2 is a double bounce artifact. The double bounce phenomenon is shown in FIG. 8. As shown in FIG. 8, light 202 may be emitted by display panel 14, reflect off of reflective polarizer 30 a first time, reflect off of partially reflective layer 22 a first time, reflect off of reflective polarizer 30 a second time, reflect off of partially reflective layer 22 a second time, and then pass through reflective polarizer 30 towards viewer 46. The light bounces off reflective polarizer twice and is therefore referred to as a double bounce artifact.

Figure 9:
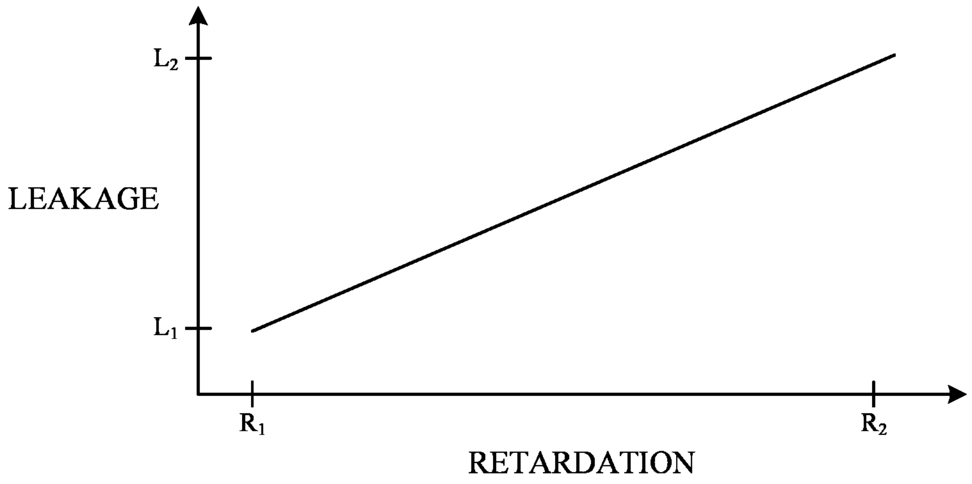
FIG. 9 is a graph of leakage associated with a double bounce artifact as a function of retardation in accordance with some embodiments.

The magnitude of the double bounce artifact may be mitigated by tuning the retardation of wave plate 28. Consider an embodiment where wave plate 28 is a quarter wave plate. The retardation of the quarter wave plate may be tuned to mitigate the luminance of the double bounce artifact within catadioptric lens system 20. FIG. 9 is a graph of leakage as a function of retardation. The leakage may refer to the magnitude of luminance of the double bounce artifact. The leakage may be normalized relative to the luminance of the primary light path through catadioptric optical system 20.

In FIG. 9, retardation may refer to the retardation of wave plate 28 for light at 590 nanometers. One quarter of 590 nanometers may be equal to a retardation of 147.5. $R_2$ may be equal to this magnitude. When the retardation is equal to $R_2$, the leakage associated with the double bounce artifact has a magnitude $L_2$. As shown in FIG. 9, decreasing the retardation may cause the leakage associated with the double bounce artifact to decrease. At lower retardation $R_1$, the leakage associated with the double bounce artifact has a magnitude $L_1$ that is lower than $L_2$. Lowering the retardation of the wave plate may therefore effectively mitigate the magnitude of the double bounce artifact.

Importantly, it is noted that reducing the retardation to mitigate the double bounce artifact may not have an adverse effect on other artifacts in optical system 20 or the primary light path through optical system 20.

The retardation of wave plate 28 may be, as one example 144. As another example, the retardation of wave plate 28 may be 138. The retardation of wave plate 28 may be less than 148, less than 147, less than 145, less than 140, etc. Wave plate 28 may still be referred to as a quarter wave plate when the retardation is within 10% of the wavelength of the light divided by 4. As an example, for 590 nanometer light the wave plate may be referred to as a quarter wave plate when the retardation is within 10% of 147.5. In one example, the thickness of the wave plate may be 47 microns.

The foregoing is merely illustrative and various modifications can be made to the described embodiments. The foregoing embodiments may be implemented individually or in any combination.

What is claimed is:

1. An electronic device comprising:

a display system configured to produce light; and a lens module that receives the light from the display system, wherein the lens module comprises:

a lens element having a convex surface and a concave surface;

a partially reflective mirror that is interposed between the lens element and the display system;

a first biaxial half wave plate, wherein the lens element is interposed between the partially reflective mirror and the first biaxial half wave plate and wherein the first biaxial half wave plate is a first Z-plate; and a first biaxial quarter wave plate that is interposed between the lens element and the first biaxial half wave plate, wherein the first biaxial quarter wave plate is a second Z-plate.

2. The electronic device defined in claim 1, wherein the display system comprises:

an array of display pixels configured to produce the light;

a linear polarizer that is formed over the array of display pixels;

a second biaxial quarter wave plate, wherein the second biaxial quarter wave plate is a third Z-plate; and a second biaxial half wave plate that is interposed between the second biaxial quarter wave plate and the linear polarizer, wherein the second biaxial half wave plate is a fourth Z-plate.

3. The electronic device defined in claim 2, wherein:

each one of the first biaxial quarter wave plate, the second biaxial quarter wave plate, the first biaxial half wave plate, and the second biaxial half wave plate has a first refractive index along a first axis that lies within a plane that includes that wave plate, a second refractive index along a second axis that lies within the plane, and a third refractive index along a third axis that is orthogonal to the plane;

the first and second axes are orthogonal;

for each one of the first biaxial quarter wave plate, the second biaxial quarter wave plate, the first biaxial half wave plate, and the second biaxial half wave plate, the first refractive index is greater than the third refractive index; and for each one of the first biaxial quarter wave plate, the second biaxial quarter wave plate, the first biaxial half wave plate, and the second biaxial half wave plate, the third refractive index is greater than the second refractive index.

4. The electronic device defined in claim 1, wherein:

each one of the first biaxial quarter wave plate and the first biaxial half wave plate has a first refractive index along a first axis that lies within a plane that includes that wave plate, a second refractive index along a second axis that lies within the plane, and a third refractive index along a third axis that is orthogonal to the plane;

the first and second axes are orthogonal;

for each one of the first biaxial quarter wave plate and the first biaxial half wave plate, the first refractive index is greater than the third refractive index; and for each one of the first biaxial quarter wave plate and the first biaxial half wave plate, the third refractive index is greater than the second refractive index.

5. The electronic device defined in claim 1, further comprising:

a positive C-plate that is adjacent to the first biaxial quarter wave plate.

6. The electronic device defined in claim 5, wherein the first biaxial quarter wave plate is interposed between the positive C-plate and the first biaxial half wave plate.

7. An electronic device comprising:

a display system configured to produce light; and a lens module that receives the light from the display system, wherein the lens module comprises:

a lens element having a convex surface and a concave surface;

a partially reflective mirror that is interposed between the lens element and the display system;

a first biaxial curved wave plate, wherein the lens element is interposed between the partially reflective mirror and the first biaxial curved wave plate; and a second biaxial curved wave plate that is interposed between the lens element and the first biaxial curved wave plate.

8. The electronic device defined in claim 7, wherein the first biaxial curved wave plate is a half wave plate and wherein the second biaxial curved wave plate is a quarter wave plate.

9. The electronic device defined in claim 7, wherein the display system comprises:

an array of display pixels configured to produce the light;

a linear polarizer that is formed over the array of display pixels a third biaxial wave plate; and a fourth biaxial wave plate that is interposed between the third biaxial wave plate and the linear polarizer.

10. The electronic device defined in claim 9, wherein the third biaxial wave plate is an additional quarter wave plate and wherein the fourth biaxial wave plate is an additional half wave plate.

11. The electronic device defined in claim 9, wherein the third biaxial wave plate has a first optical axis that is at a 15 degree angle relative to a reference axis and wherein the fourth biaxial wave plate has a second optical axis that is at a 75 degree angle relative to the reference axis.

12. The electronic device defined in claim 7, wherein the first biaxial wave plate has a first optical axis that is at a 75 degree angle relative to a reference axis and wherein the second biaxial wave plate has a second optical axis that is at a 15 degree angle relative to the reference axis.

13. The electronic device defined in claim 7, further comprising:

a positive C-plate that is adjacent to the first biaxial wave plate.

14. The electronic device defined in claim 7, wherein the first biaxial curved wave plate or the second biaxial curved wave plate conforms to a curvature of the lens element.

15. The electronic device defined in claim 7, wherein the first biaxial curved wave plate or the second biaxial curved wave plate has compound curvature.

16. The electronic device defined in claim 1, wherein the first biaxial half wave plate and the first biaxial quarter wave plate are self-compensating.

17. The electronic device defined in claim 16, wherein a first change in retardation caused by a first strain in the first biaxial quarter wave plate is compensated by a corresponding second change in retardation caused by a second strain in the first biaxial half wave plate.

* * * * *